United States Patent [19]

Watanabe

[11] Patent Number: 5,128,696

[45] Date of Patent: Jul. 7, 1992

[54] LINE HEAD DEVICE

[75] Inventor: Noriyuki Watanabe, Shizuoka, Japan

[73] Assignee: Tokyo Electric Co., Ltd., Tokyo, Japan

[21] Appl. No.: 658,350

[22] Filed: Feb. 20, 1991

[30] Foreign Application Priority Data

Feb. 23, 1990 [JP] Japan .................. 2-40934

[51] Int. Cl.$^5$ .............. G01D 15/06; G01D 15/14
[52] U.S. Cl. .............................. 346/155; 346/160
[58] Field of Search ............... 346/154, 155; 355/317

[56] References Cited

U.S. PATENT DOCUMENTS

| | | | |
|---|---|---|---|
| 4,731,622 | 3/1988 | Hicks et al. | 346/157 |
| 4,782,361 | 11/1988 | Spinelli et al. | 355/14 R |
| 4,855,767 | 8/1989 | Sato et al. | 346/154 x |
| 4,916,470 | 4/1990 | Kovacs et al. | 346/155 X |
| 4,994,864 | 2/1991 | Schieck et al. | 355/317 |

FOREIGN PATENT DOCUMENTS 2-171260  7/1990  Japan .

Primary Examiner—George H. Miller, Jr
Attorney, Agent, or Firm—Frishauf, Holtz, Goodman & Woodward

[57] ABSTRACT

A line head device comprises a line head that has plural blocks of EL elements arranged in a row in the direction of a printing line for paper supplied to a transfer position and printed in line units. In the line head device, the line head has more than n blocks of EL elements, where n is the maximum number of EL elements required for the printing, and switches and a control circuit are provided to enable a group of n successive EL elements to be driven and change the group in accordance with paper alignment error in the processing line direction.

10 Claims, 4 Drawing Sheets

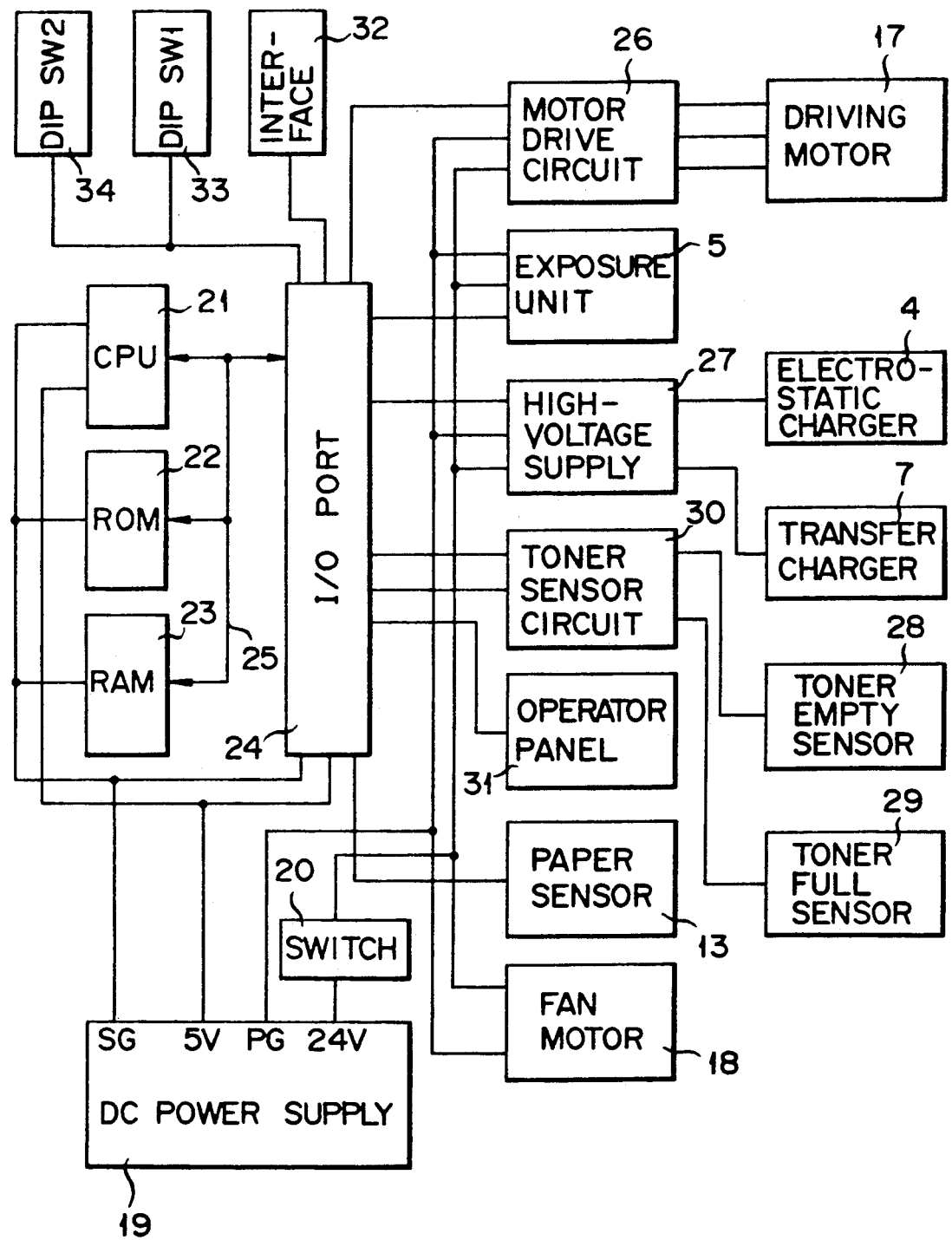
F I G. 2

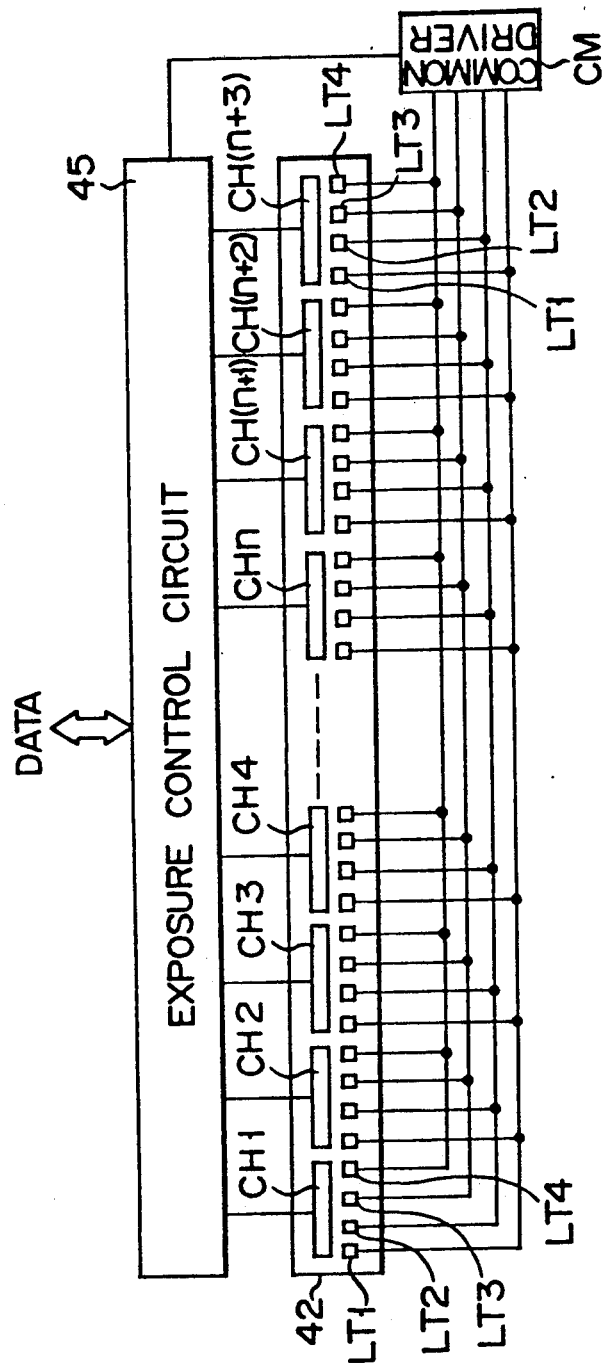
F I G. 3

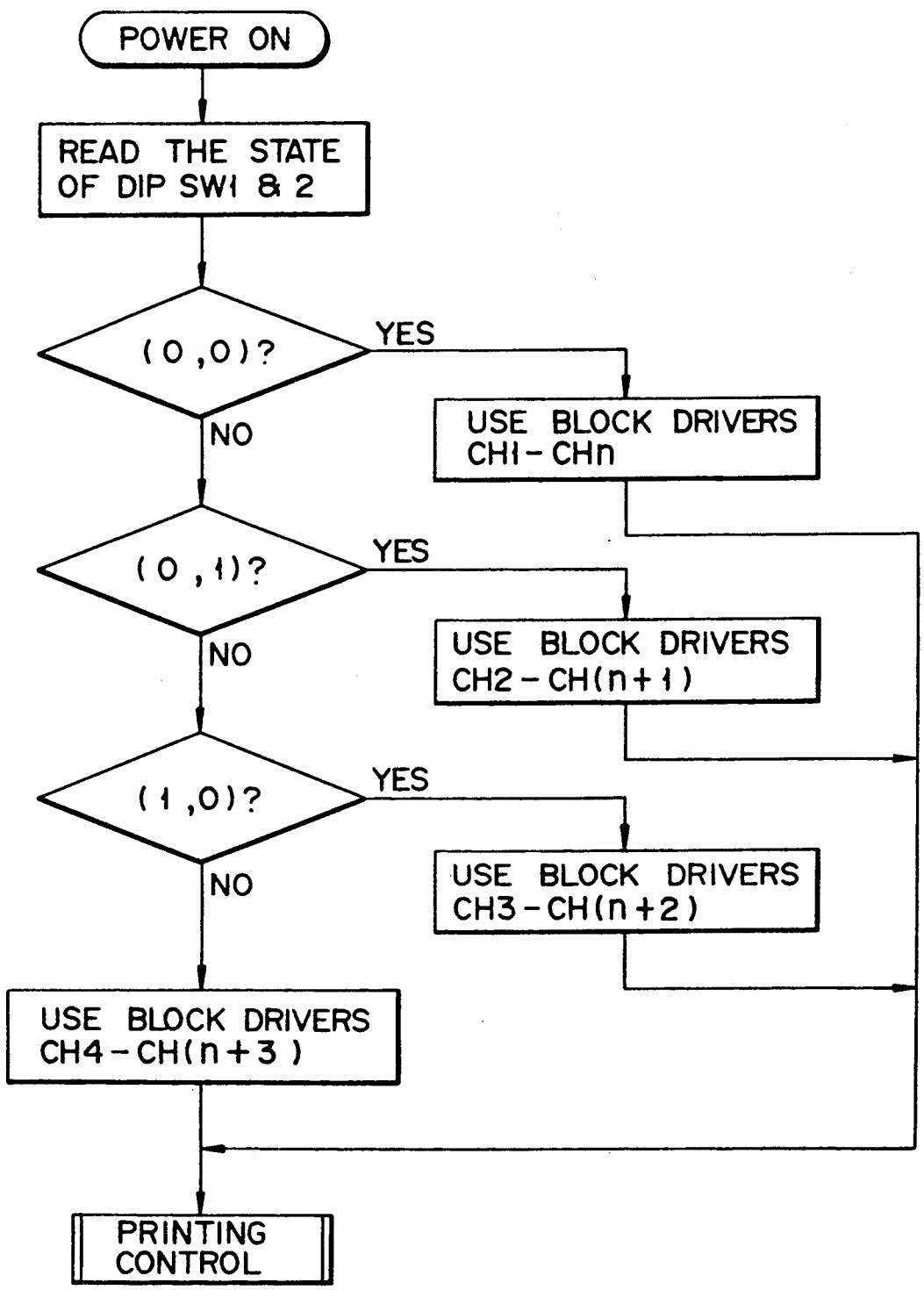
F I G. 4

LINE HEAD DEVICE

BACKGROUND OF THE INVENTION

1. Field of the Invention

This invention relates to a line head device to be incorporated in a paper processing apparatus such as electrophotographic printing apparatus or facsimiles.

2. Description of the Related Art

In ordinary electrophotographic printing apparatus, a surface of the photosensitive drum is uniformly electrified and selectively exposed, according to the input image information, to form an electrostatic latent image. The latent image is developed by toner fed to the photosensitive drum. The toner adheres to the surface of the photosensitive drum in accordance with the latent image, making the latent image visible as a toner image. The toner image is transferred from the surface of the photosensitive drum to a sheet of charged paper by electrostatic attraction. After the image transfer, the toner image is fixed to the paper by using heat and temperature. For exposure of the photosensitive drum, the following line head is used, for example. This line head is composed of an array of edge light-emitting elements arranged in one row, and is secured so as to be parallel with the axis of the photosensitive drum. A paper feeding mechanism picks up sheets of paper stored in a paper cassette one by one, and delivers the paper sheet to the transfer or print position.

Before shipment of those devices, manufacturers check to see if they operate properly. Actual inspection sometimes finds that a printed image is deviated from a desired position due to the misalignment of paper. In this case, the line head position will be adjusted or the operation of the feeding mechanism will be corrected. This work is troublesome and require high accuracy.

SUMMARY OF THE INVENTION

The object of the present invention is to provide a line head device that eliminates the misalignment of paper.

This object is achieved by a line head device comprising: a head that has more than N head elements arranged in a row in the direction of a processing line for paper supplied to a specific position and processed in line units, where N is the maximum number of head elements required for the processing; and a selecting section for enabling a group of N successive head elements to be driven and changing the group in accordance with paper alignment error in the processing line direction.

With this line head device, when inspection has found that paper is supplied to the specific position with alignment error in the processing line direction, the selecting section changes the group of N successive head elements in accordance with the alignment error. Since the processing rang of the head is shifted to compensate for the alignment error, it is possible to eliminate the misalignment of paper.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a block diagram for the control circuit in the electrophotographic printing apparatus;

FIG. 3 shows the structure of the exposure unit shown in FIG. 1; and

FIG. 4 illustrates operation for compensating for misalignment of paper.

DETAILED DESCRIPTION OF THE PREFERRED EMBODIMENT

Figure 1:
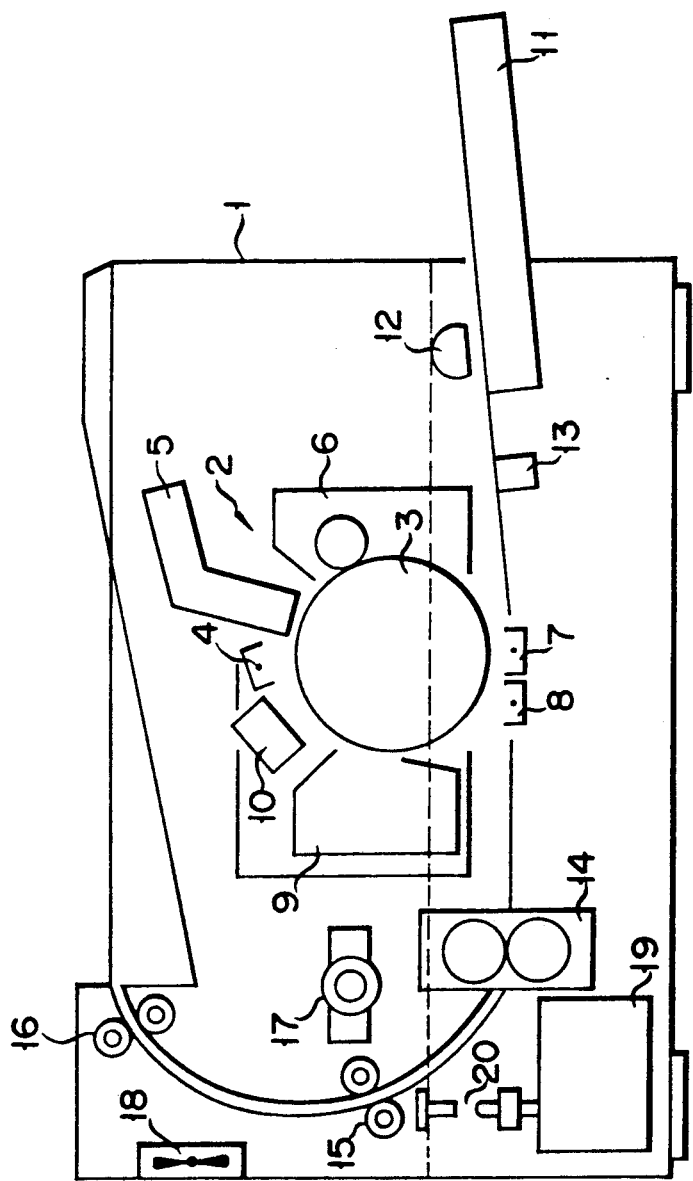
FIG. 1 is an internal schematic diagram of an electrophotographic printing apparatus according to an embodiment of the present invention.

An electrophotographic printing apparatus according to an embodiment of the present invention will be explained, with reference to FIGS. 1 to 4.

FIG. 1 is an internal schematic of the electrophotographic printing apparatus. This apparatus contains a cabinet 1 whose top can be pivotally opened, and a drum unit 2 installed near the center of the cabinet 1. The drum unit 2 comprises a photosensitive drum 2, an electrostatic charger 4, a developing unit 6, a cleaning unit 9, and a deelectrifying lamp 10. Installed around the photosensitive drum to perform printing operation through electrophoto graphic processes are the electrostatic charger 4, an exposure unit 5, the developing unit 6, a transfer charger 7, the cleaning unit 9, and the deelectrifying lamp 10.

The photosensitive drum 3 has a photosensitive surface made of photoconductive material, and is driven to rotate in the clockwise direction. The electrostatic charger 4 electrifies the surface of the photosensitive drum 3 uniformly. The exposure unit 5 selectively projects light on to the surface of the photosensitive drum 3 according to the input image information to form an electrostatic latent image. The developing unit 6 supplies toner that adheres to the photosensitive surface based on the latent image, there by developing the latent image. The transfer charger 7 electrifies paper and transfers the toner image to the paper from the surface of the photosensitive drum 3 by electrostatic attraction. The cleaning unit 9 removes the toner left in the surface of the photosensitive drum 3 withstanding against electrostatic attraction after the image transfer. The deelectrifying lamp 10 removes unnecessary charges from the surface of the photosensitive drum 3 surface after the image transfer in order to electrify the surface of the photosensitive drum 3 again.

The electrophotographic printing apparatus further comprises a deelectrifying charger 8, a paper cassette 11, a pickup roller 12, a paper sensor 13, a fixing unit 14, paper delivery rollers 15 and 16, a driving motor 17, a fan motor 18, a DC power supply 19, and an opening detector switch 20. Sheets of paper are contained in the paper cassette 11, from which the pickup roller 12 takes out paper sheet by sheet at a specific timing and supplies it through the feeding passage PH to the transfer charger 7. The deelectrifying charger 8, located adjacent to the transfer charger 7 below the photosensitive drum 3, removes charge from the electrified paper after being transferred by the transfer charger 7. The resulting paper is then supplied to the fixing unit 14 that fixes the toner image on to the paper using heat and pressure. The paper thus treated is delivered to the top of the cabinet 1 by means of the paper delivery rollers 15 and 16. These rollers 15 and 16, pickup roller 12, and photosensitive drum 3 are driven by the driving motor 17. The fan motor 18 disposes of unwanted heat within the cabinet 1. The opening detector switch 20 detects the cabinet top being opened. The paper sensor 13 senses travel of paper through the feeding passage PH, the paper size, and paper jams.

FIG. 2 shows the control circuit of the electrophotographic printing apparatus. Here, the printing apparatus contains a CPU (Central Processing Unit) 21 for processing various data necessary for control of printing operation, a ROM (Read Only Memory) 22 for storing a control program for the CPU 21, a RAM (Random Access Memory) for temporarily storing the input/output data from the CPU 12 including image information and various commands both transmitted from an external host computer (not shown), an I/O port 24 for peripheral circuits described below, and a bus line 25 for interconnecting the CPU 21, ROM 22, RAM 23, and I/0 port 24.

The I/0 port 24 is connected to a motor drive circuit 26, an exposure unit 5, a high-voltage supply circuit 27, a toner sensor 30, an operator panel 31, the paper sensor 13, the fan motor 18, an interface 32, and a first and second DIP switches 33 and 34. The motor drive circuit 26 actuates the driving motor 17. The high-voltage supply circuit 27 supplies a high-voltage to the electrostatic charger 4 and transfer charger 7. The toner sensor circuit 30 receives the output signal from each of the a toner empty sensor 28 and a toner full sensor 29. The operator panel 31 is operated to enter the necessary information for control of printing operation. The opening detector switch 20, which is inserted in the power supply line that supplies power voltage of 24 V from the DC power supply 16 to the exposure unit 5, motor drive circuit 26, high-voltage power circuit 27, and fan motor 18, and turns off the power supply when the top of the cabinet 1 is opened.

FIG. 3 illustrates the structure of the exposure unit 5. This unit is made up of a line head 42, an exposure control circuit 45, block drivers CH1 through CH(n+3), and a common driver CM, so as to expose the surface of the photosensitive drum in lines. The line head 42 has n+3 blocks of EL (electroluminescent) elements, each block containing four EL elements LT1 through LT4. These 4(n+3) EL elements are all arranged in a row at a pitch of ¼mm. The line head 42 is secured so that the row of EL elements is parallel with the axis of the photosensitive drum 3. The exposure control circuit 45 receives image information for each line supplied from the CPU 21 via the I/0 port 24, and converts the information into exposure control data for the exposure using the line head 42. The block drivers CH1 through CH(n+3) are connected to the block electrodes of (n+3) EL element blocks, and sequentially supply a block signal of DC voltage pulse to the block electrodes. The common driver CM is connected to the common electrode of each of EL elements LT1 through LT4 of all blocks, selectively supplies a common signal of AC voltage pulse to the common electrodes of the EL elements LT1 through LT4 corresponding to one of the block electrodes which is now receiving the block signal. One line of image is obtained by supplying the common and block signals to the EL elements specified according to the exposure control data and scanning the surface of the photosensitive drum 3 with light emitted from each of the specified EL elements. The total number of EL elements "4(n+3)" is the sum of the number of EL elements "4n" contained in n EL element blocks needed for the maximum printing width n mm of paper supplied to the transfer position and the number of EL elements "12" contained in three extra EL element blocks for compensating for misalignment of paper.

FIG. 4 shows the misalignment compensating process of the electrophotographic printing apparatus. When the power is turned on, the CPU 21 first reads the on (1)/off (0) state of the first and second DIP switches 33 and 34. When the CPU 21 senses that both switches 33 and 34 are off (0,0), it controls the exposure control circuit 45 so as to enable the block drivers CH1 through CHn and disable CH(n+1) through CH(n+3), which permits n blocks of n+3 EL-element blocks to operate.

When the CPU 21 detects that the first DIP switch 33 is off and second one 34 is on (0,1), it controls the exposure control circuit 45 so as to enable the block drivers CH2 through CH(n+1) and disable CH1 and CH(n+2) and CH(n+3), which allows n blocks of n+3 EL-element blocks to operate.

When the CPU 21 detects that the first DIP switch 33 is on and second one 34 is off (1,0), it controls the exposure control circuit 45 so as to enable the block drivers CH3 through CH(n+2) and disable CH1, CH2, and CH(n+3), which allows n blocks of n+3 EL-element blocks to operate.

When the CPU 21 detects that both switches 33 and 34 are on (1,1), it controls the exposure control circuit 45 so as to enable the block drivers CH4 through CH(n+3) and disable CH1, CH2, and CH3, which permits n blocks of n+3 EL-element blocks to operate.

Then, the CPU 21 executes a particular printing control sequence.

In this embodiment, when the first DIP switch 33 is off and the second DIP switch 34 is on, the exposure control circuit 45 selects block drovers CH2 through CH(n+1). 4n consecutive EL elements allocated to these block drivers CH2 through CH(n+1) are selectively actuated to form an electro static latent image of the image information on the surface of the photosensitive drum. The electrostatic latent image thus produced is made visible at the developing unit 6 and then transferred on to the paper by the transfer charger 7. In this case, the range scanned by the 4n EL elements corresponding to the block drivers CH2 through CH(n+1) is the printing range for each printing line.

When both first and second DI switches 33 and 34 are off, the exposure control circuit 45 selects block drovers CH1 through CHn. 4n consecutive EL elements allocated to these block drivers CH1 through CHn are selectively actuated to form an electrostatic latent image of the image information on the photosensitive drum surface. The latent image is made visible at the developing unit 6 and then transferred on to the paper by the transfer charger 7. In this case, the range scanned by the 4n EL elements corresponding to the block drivers CH1 through CHn is the printing range for each printing line. Therefore, compared with the case where the first DIP switch 33 is off and the second DIP switch 34 is on, the printing range shifts by −1 mm in the printing line.

When the first DIP switch 33 is on and the second DIP switch 34 is off, the exposure control circuit 45 selects bock drovers CH3 through CH(n+2). 4n consecutive EL elements allocated to these block drivers CH3 through CH(n+2) are selectively actuated to form an electrostatic latent image of the image information on the photosensitive drum surface. The electrostatic latent image thus produced is made visible at the developing unit 6 and then transferred on to the paper by the transfer charger 7. In this case, the range scanned by the 4n EL elements corresponding to the block drivers CH3 through CH(n+2) is the printing range for each printing line. Thus, compared with the case where the first DIP switch 33 is off and the second DIP switch 34 is on, the printing range shifts by +1 mm in the printing line.

When both first and second DIP switches 33 and 3 are on, the exposure control circuit 45 selects block drovers CH4 through CH(n+3). 4n consecutive EL elements allocated to these block drivers CH4 through CH(n+3) are selectively actuated to form a electrostatic latent image of the image information on the photosensitive drum surface. The latent image is made visible at the developing unit 6 and then transferred on to the paper by the transfer charger 7. In this case, the range scanned by the 4n EL elements corresponding to the bock drivers CH4 through CH(n+3) is the printing range for each printing line. Therefore, compared with the case where the first DIP switch 33 is off and the second DIP switch 34 is on, the printing range shifts by +2 mm in the printing line.

With the embodiment, just switching on and off the first and second DIP switches 33 and 34 shifts the printing range in the printing line. Accordingly, when inspection has found that the paper is fed to the transfer charger 7 in misalignment in the direction of printing line due to mechanical or other errors in the paper feeding mechanism, this misalignment can be compensated for by shifting the printing range by the alignment error by means of the first and second DIP switches 33 and 34. As a result, this makes it unnecessary to carry out complex, delicate correction work, including the adjustment of the head position and the operational correction of the paper feeding mechanism, previously found in a conventional apparatus.

Manufacturers can easily maintain the quality of products high. Therefore, it is possible to ship the products immediately after the inspection, even if a misalignment is found.

A misalignment may occur as time elapses after the shipment. However, this problem can also be remedied by switching of switches 33 and 34.

In the embodiment, the control circuit of the printing apparatus is used to enable a group of n successive EL elements to be driven. However, a dedicated circuit can be provided for this operation. Further, the present invention may be applied to thermal printers in which the line head has thermal printing elements serving as head elements, or facsimiles in which the line head has photosensors serving as head elements.

This invention may be practiced or embodied in still other ways without departing from the spirit or essential character thereof.

The preferred embodiment described herein is therefore illustrative and not restrictive, the scope of the invention being indicated by the appended claim and all variations which come within the meaning of the claim are intended to be embraced therein.

What is claimed is:

1. A line head device comprising:
   a head that has more than N head elements arranged in a row in the direction of a processing line for paper supplied to a specific position and processed in line units, where N is the maximum number of head elements required for the processing; and
   selecting means for enabling a group of N successive head elements to be driven and changing the group in accordance with paper alignment error in the processing line direction.

2. A line head device according to claim 1, wherein said selecting means includes switch means for selecting a group of N successive head elements, and control means for enabling the selected group to be driven.

3. A line head device according to claim 2, wherein said control means includes a control circuit of the paper processing apparatus in which said line head device is incorporated.

4. A line head device according to claim 3, wherein said control circuit of the paper processing apparatus includes driver circuits each for driving a preset number of successive head elements, and said control means includes inhibiting means for selectively inhibiting the operations of said driver circuits.

5. A line head device according to claim 4, wherein said head element is a light-emitting element.

6. A line head device according to claim 1, wherein said head element is a light-emitting element.

7. A line head device according to claim 4, wherein said head element is a printing element.

8. A line head device according to claim 4, wherein said head element is a photosensor.

9. A line head device according to claim 1, wherein said head element is a printing element.

10. A line head device according to claim 1, wherein said head element is a photosensor.

* * * * *